(12) United States Patent
Sugita et al.

(10) Patent No.: US 9,986,134 B2
(45) Date of Patent: May 29, 2018

(54) PROFILE CREATION APPARATUS, NON-TRANSITORY COMPUTER-READABLE STORAGE MEDIUM STORING PROFILE CREATION PROGRAM AND COLOR MATCHING METHOD

(71) Applicant: KONICA MINOLTA, INC., Chiyoda-ku, Tokyo (JP)

(72) Inventors: Tsuyoshi Sugita, Hachioji (JP); Katsuji Kondo, Hino (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 20 days.

(21) Appl. No.: 15/297,577

(22) Filed: Oct. 19, 2016

(65) Prior Publication Data
US 2017/0118382 A1 Apr. 27, 2017

(30) Foreign Application Priority Data
Oct. 21, 2015 (JP) .................. 2015-207275

(51) Int. Cl.
*G06F 15/00* (2006.01)
*H04N 1/60* (2006.01)

(52) U.S. Cl.
CPC ................. *H04N 1/6055* (2013.01)

(58) Field of Classification Search
CPC ................................ H04N 1/6055
USPC ........................................ 358/1.9
See application file for complete search history.

(56) References Cited

U.S. PATENT DOCUMENTS

| 2011/0043834 A1 | 2/2011 | Tomita | |
| 2012/0218572 A1* | 8/2012 | Kishino | H04N 1/6005 358/1.9 |
| 2014/0168674 A1* | 6/2014 | Shin | H04N 1/6055 358/1.9 |

FOREIGN PATENT DOCUMENTS

| JP | 2010-187330 A | 8/2010 |
| JP | 2011-155352 A | 8/2011 |

* cited by examiner

*Primary Examiner* — Mark R Milia
(74) *Attorney, Agent, or Firm* — Buchanan Ingersoll & Rooney PC

(57) ABSTRACT

Provided are a profile creation apparatus, a non-transitory computer-readable storage medium storing a profile creation program and a profile creation method. The profile creation apparatus includes a standard-color-profile obtaining section that obtains a standard color profile and a reference-device-profile obtaining section that obtains a reference-device profile. The profile creation apparatus further includes a color-conversion-table creation section that creates a color conversion table by combining the standard color profile and reference-device profile with being weighted such that a weighed ratio of the standard color profile increases as chroma calculated from input color values of the color conversion table increases, in a predetermined chroma region. The profile creation apparatus further includes a color conversion section that performs color conversion on a print image by using the color conversion table and outputs the print image to a certain printing device.

18 Claims, 12 Drawing Sheets

PROFILE CREATION APPARATUS, NON-TRANSITORY COMPUTER-READABLE STORAGE MEDIUM STORING PROFILE CREATION PROGRAM AND COLOR MATCHING METHOD

The entire disclosure of Japanese Patent Application No. 2015-207275 filed on Oct. 21, 2015 including description, claims, drawings, and abstract are incorporated herein by reference in its entirety.

TECHNICAL FIELD

The present invention is directed a profile creation apparatuses, non-transitory computer-readable storage media each storing a profile creation program and color matching methods. In particular, the present invention is directed to a profile creation apparatus which is connected to a printing system including a plurality of image forming apparatuses, a non-transitory computer-readable storage medium storing a profile creation program to be executed in the profile creation apparatus, and a color matching method to be used in a printing system including a plurality of image forming apparatuses.

BACKGROUND

In operation of a printing system so as to perform efficient printing by using an offset printing machine for high volume print jobs and utilizing a digital printing machine for low volume print jobs, there is a demand for matching color of printed matters output from the both types of printing machines. Further, in commercial printing, it is requested to output printed matters by using colors conforming to industry standards of print color (referred to as standard colors), such as "Japan Color", "Fogra", and "GRACoL", consistent with the international standards including ISO-12647-2.

DESCRIPTION OF THE RELATED ART

As an example of a method of adjusting color of printed matters, which does not relate to a method for use in a printing system including a plurality of printing devices being a mixture of offset printing machines, digital printing machines and others, JP-A No. 2011-155352 discloses the following method which enables chromaticity correction in accordance with the characteristics of an output device. In the method, input data is converted into information based on the three attributes of colors (LCH), and the resulting information is corrected by using the direction and correction rate of chromaticity correction which are defined in accordance with a given chromaticity-correction level. As another example, JP-A No. 2010-187330 (corresponding to US2011/0043834A1) discloses a method of creating a plurality of divided regions in a device-independent color space and performing color conversion on the regions on the basis of respective different standards.

Color matching performed separately for an offset printing machine and a digital printing machine by using standard colors as targets can make a difference in colors between printed matters output by the two types of printing machines because color matching can cause errors due to interpolation calculation and mapping. Human eye is more sensitive to color difference particularly in a low chroma region, and perceived color difference strongly influences observer's impressions of a whole image. Accordingly, even if color values represented by each of an offset printing machine and a digital printing machine fall within the tolerance of the standard colors, those color values may make perceptible color difference between these printing machines.

As a method of solving the perceptible color difference, a method may be considered so as to match colors of an offset printing machine with standard colors as targets and then match colors of a digital printing machine (secondary device) with colors of the offset printing machine as a reference device. With this method, the perceptible color difference between printed matters output by the two printing machines can be suppressed. However, in this method, errors caused in the color matching for the reference device can affect the color matching for the secondary device, which can result in that colors represented by the secondary device are out of the tolerance of the standard colors. Errors in color matching become larger particularly in a high chroma region which is near to the boundary of the color gamut, in comparison with those in a low chroma region. Therefore, colors represented by the secondary device in the high chroma region tend to be out of the tolerance of the standard colors.

SUMMARY

The present invention is directed to profile creation apparatuses, non-transitory computer-readable storage media each storing a profile creation program and profile creation methods, which can match impressions about the appearance of printed matters given by plural types of printing devices with each other, and can control deviation of colors of the printed matters from standard colors.

A profile creation apparatus reflecting one aspect of the present invention is a profile creation apparatus comprising a storage unit; and a standard-color-profile obtaining section that obtains a standard color profile to be used for color conversion of input color values into color values defined according to standard colors. The profile creation apparatus further comprises a reference-device-profile obtaining section that obtains a reference-device profile created by using measured color values of a printed matter obtained by printing of a first print image with a first printing device, where the first print image is a print image on which color conversion was performed by using the standard color profile. The profile creation apparatus further comprises a color-conversion-table creation section that creates a color conversion table to be used for color conversion of input color values into target color values, by combining the standard color profile and the reference-device profile, and stores the color conversion table in the storage unit. The profile creation apparatus further comprises a color conversion section that performs color conversion on a second print image to be printed by a second printing device, by using the color conversion table stored in the storage unit, and outputs to the second printing device the second print image on which the color conversion was performed. The color-conversion-table creation section obtains the target color values to create the color conversion table, by adding the standard color profile and the reference-device profile with being weighted by using a factor such that a weighed ratio of the standard color profile increases as chroma calculated from the input color values of the color conversion table increases, for values of the chroma which fall within a predetermined chroma region.

A non-transitory computer-readable storage medium reflecting one aspect of the present invention stores a profile creation program to be executed in a profile creation apparatus to be connected to a plurality of printing devices. The profile creation program, when being executed, causes a control unit of the profile creation apparatus to perform the following processing. The processing comprises obtaining a standard color profile to be used for color conversion of input color values into color values defined according to standard colors; and obtaining a reference-device profile created by using measured color values of a printed matter obtained by printing of a first print image with a first printing device, where the first print image is a print image on which color conversion was performed by using the standard color profile. The processing further comprises creating a color conversion table to be used for color conversion of input color values into target color values, by combining the standard color profile and the reference-device profile, to store the color conversion table in a storage unit of the profile creation apparatus. The processing further comprises performing color conversion on a second print image to be printed by a second printing device, by using the color conversion table stored in the storage unit, to output to the second printing device the second print image on which the color conversion was performed. The creating the color conversion table, includes obtaining the target color values by adding the standard color profile and the reference-device profile with being weighted by using a factor such that a weighed ratio of the standard color profile increases as chroma calculated from the input color values of the color conversion table increases, for values of the chroma which fall within a predetermined chroma region.

A color matching method reflecting one aspect of the present invention is a method to be used in a printing system including a plurality of printing devices, a profile creation apparatus, a client terminal and a color measurement device. The method comprises creating a color chart, including creating an image of a color chart by performing color conversion on a first print image by using a standard color profile to be used for color conversion of input color values into color values defined according to standard colors, and causing a first printing device to print the image of the color chart and output the color chart. The method further comprises creating a reference-device profile by the client terminal, including obtaining measured color values of the color chart by causing the color measurement device to measure the color chart, and creating the reference-device profile by using the measured color values. The method further comprises obtaining the standard color profile by the profile creation apparatus; and obtaining the reference-device profile from the client terminal by the profile creation apparatus. The method further comprises creating by the profile creation apparatus a color conversion table to be used for color conversion of input color values into target color values, by combining the standard color profile and the reference-device profile, to store the color conversion table in a storage unit of the profile creation apparatus. The method further comprises performing by the profile creation apparatus color conversion on a second print image to be printed by a second printing device, by using the color conversion table stored in the storage unit; and outputting by the profile creation apparatus the second print image on which the color conversion was performed, to the second printing device. The creating the color conversion table, includes obtaining the target color values by adding the standard color profile and the reference-device profile to be weighted by using a factor such that a weighed ratio of the standard color profile increases as chroma calculated from the input color values of the color conversion table increases, for values of the chroma which fall within a predetermined chroma region.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Figure 1:
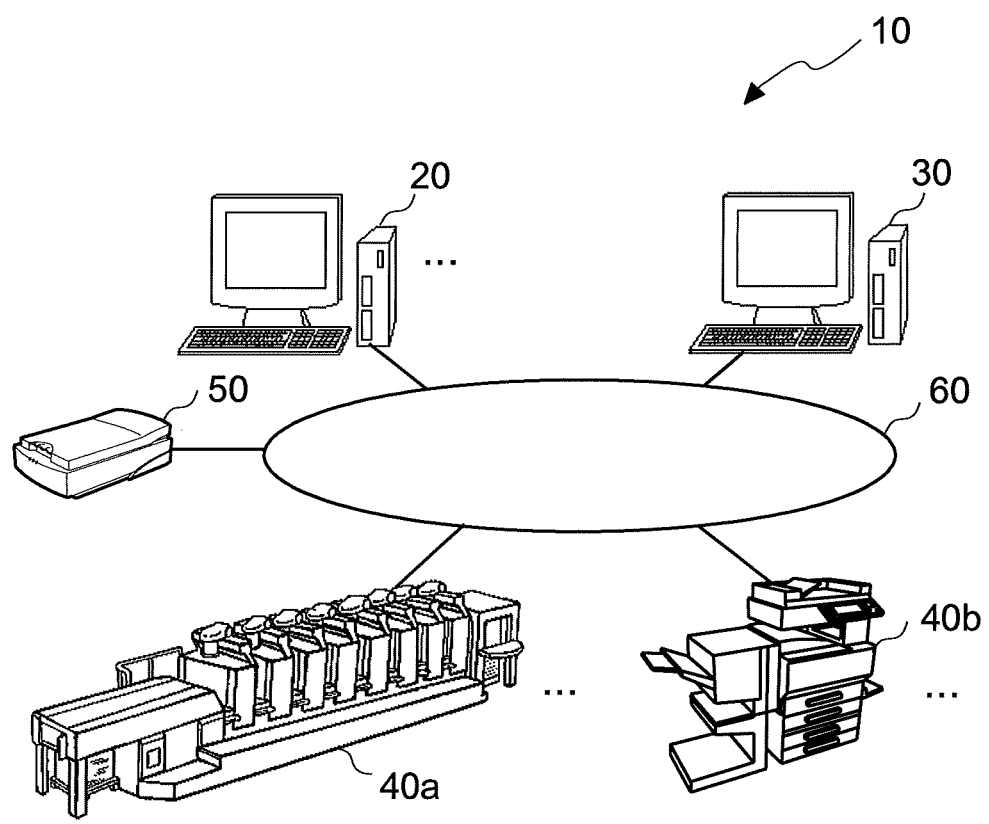
FIG. 1 is a schematic diagram illustrating an example of the constitution of a printing system according to one embodiment of the present invention.

Hereinafter, an embodiment of the present invention will be described with reference to the drawings. However, the scope of the invention is not limited to the illustrated examples.

Profile creation apparatuses, non-transitory computer-readable storage media each storing a profile creation program and color matching methods as embodiments of the present invention, can match impressions about the appearance of printed matters given by plural types of printing machine with each other and can control deviation of colors of the printed matters from standard colors.

That is because a profile creation apparatus is configured to create the following color conversion table, store the color conversion table into a storage unit, perform color conversion on a print image to be printed by a specific printing device by using the color conversion table stored in the storage unit, and output to the specific printing device the print image on which the color conversion has been performed. In concrete terms, the profile creation apparatus obtains a standard color profile to be used for color conversion of input color values into color values defined according to standard colors, and further obtains a reference-device profile created by using measured color values of a printed matter obtained by printing of a first print image with a first printing device, where the first print image is a print image on which color conversion was performed by using the standard color profile. The profile creation apparatus then creates a color conversion table to be used for color conversion of input color values into target color values, by combining the standard color profile and the reference-device profile, and stores the color conversion table in the storage unit. The profile creation apparatus performs color conversion on a second print image to be printed by a second printing device, by using the color conversion table stored in the storage unit, and outputs to the second printing device the second print image on which the color conversion was performed. In the creation of the color conversion table, the profile creation apparatus obtains the target color values by adding the standard color profile and the reference-device profile with being weighted by using a specific factor such that a weighed ratio of the standard color profile increases as chroma calculated from the input color values of the color conversion table increases (have a higher value) if the value of chroma falls within a predetermined chroma region.

Employing such a profile creation apparatus enables color matching for plural printing devices such that color matching is performed for a reference device among the plural printing devices by using standard colors as targets, and color matching is performed for a secondary device among the plural printing device so that resulting colors are close to colors of the reference device in a low chroma region and resulting colors are close to standard colors in a high chroma region.

Figure 14:
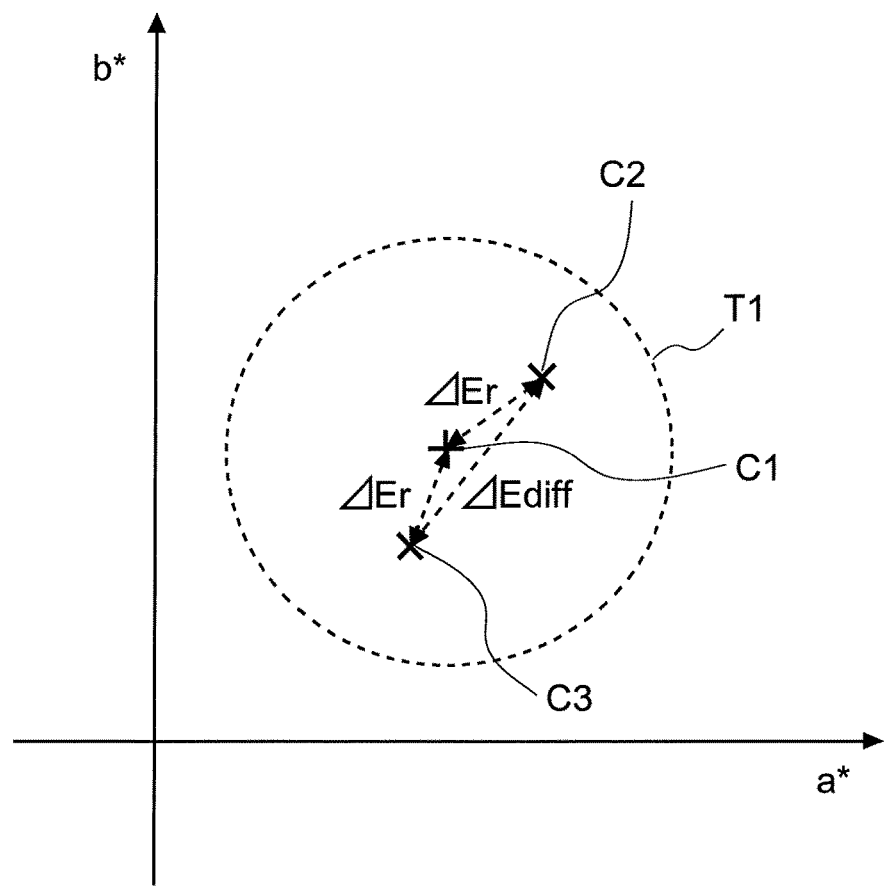
FIG. 14 is a diagram for illustrating a matter which may arise after colors of each of an offset printing machine and a digital printing machine are matched with standard colors.

As described in BACKGROUND, in the operation so as to perform efficient printing by using an offset printing machine for high volume printing jobs and by utilizing a digital printing machine for low volume printing jobs, color matching performed separately for those printing machines by using standard colors as targets, can make a difference in colors between printed matters output by those printing machines. Description is given to this matter with reference to FIG. 14. FIG. 14 is a diagram of the a*b* chromaticity in a color space defined by L*a*b* coordinates. In the diagram, C1 (the "+" or plus mark in the diagram) represents target color values $L_1a_1b_1$ as one standard color, T1 (the circle drawn with a broken line in the diagram) represents the tolerance of the standard color (for example, Japan Color standard tolerance $\Delta Eave \leq 3$, or $\Delta Emax \leq 6$), and C2 and C3 (the "x" or cross marks in the diagram) represent the corresponding color values $L_2a_2b_2$ represented by an offset printing machine and the corresponding color values $L_3a_3b_3$ represented by a digital printing machine, respectively (both are color values obtained after color matching is performed for these printing machines by using the standard color as targets). As can be seen from FIG. 14, after color of each of the offset printing machine and the digital printing machine is matched with the standard color, the resulting color values of each of the offset printing machine and the digital printing machine can have a color difference or deviation ($\Delta Er$) from the standard color. If the color values of the both printing machines deviate in the opposite directions from the standard color on the chromaticity diagram, it increases the difference ($\Delta Ediff$) between the color values of the offset printing machine and the color values of the digital printing machine.

Figure 15A:
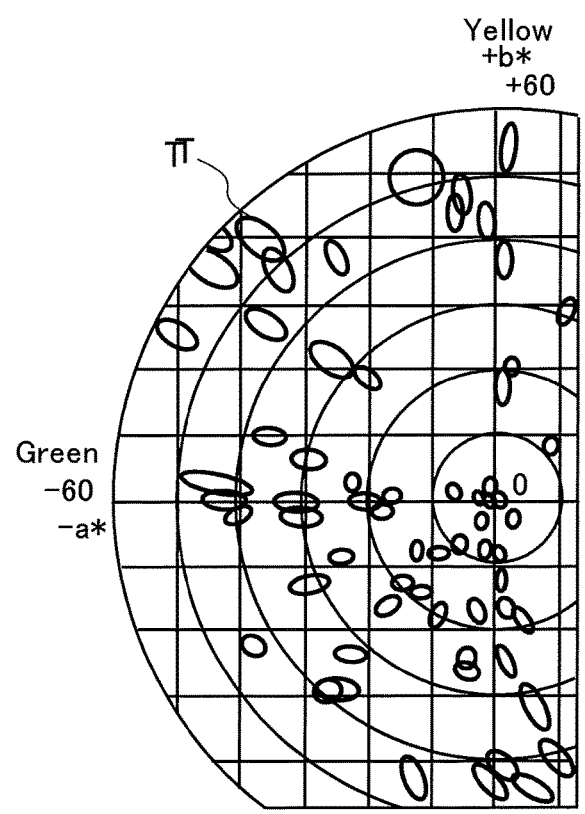
FIGS. 15A and 15B are diagrams for illustrating human eye's ability to decimate colors.
Figure 15B:
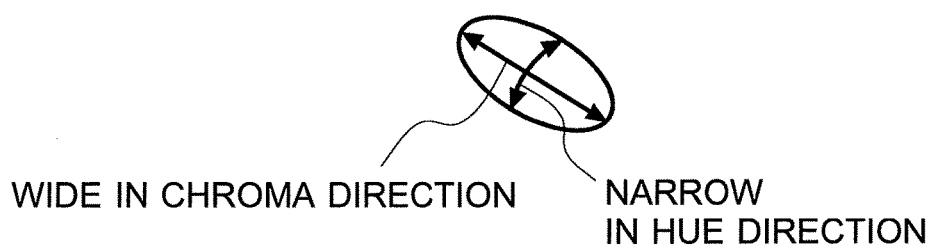

Human eye is sensitive to color difference particularly in a low chroma region, and perceived color difference strongly influences observer's impressions of a whole image. Accordingly, even if color values given by each of an offset printing machine and a digital printing machine are within the tolerance of the standard colors, those color values can make perceptible color difference between those printing machines. FIG. 15A is a partial view of the a*b* chromaticity diagram, and ellipses in black in the chromaticity diagram each represents a color discrimination region or a color discrimination ellipse of human eye for each chroma and each hue. FIG. 15B illustrates an example of the color discrimination region of human eye for high chroma colors (color discrimination region T for one of colors in the outer peripheral part in the a*b* chromaticity diagram of FIG. 15A). All colors contained in the color discrimination region are indistinguishable, to human eye, from the color at the center of the elliptical region even if the colors are numerically different from each other. As illustrated in FIG. 15B, a high chroma color (a color in the outer peripheral part in the a*b* chromaticity diagram) provides a color discrimination region of human eye, having an elliptical shape which is narrow in the hue direction and is wide or elongated in the chroma direction, so that human eye hardly perceives color differences (particularly, chroma differences) between high chroma colors. On the other hand, a low chroma color (a color around the center of the a*b* chromaticity diagram of FIG. 15A) provides a color discrimination region of human eye, having a shape near to a true circle, so that human eye easily perceives color differences (particularly, chroma differences) between low chroma colors in comparison with color differences between high chroma colors. Therefore, in the low chroma region, even if the color values of an offset printing machine and the color values of a digital printing machine are within the tolerance of standard colors, the color values can make remarkable perceptible color difference between these printing machines.

As a method of solving the above matter, a method may be considered so as to match colors of an offset printing machine with standard colors as targets and then match colors of a digital printing machine (secondary device) with colors of the offset printing machine as a reference device. However, in this method, errors in the color matching for the reference device can affect the color matching for the secondary device, which can result in that colors represented by the secondary device are out of the tolerance of the standard colors. Errors in color matching become larger particularly in a high chroma region which is near to the boundary of the color gamut, in comparison with those in a low chroma region. Therefore, colors represented by the secondary device in the high chroma region tend to be out of the tolerance of the standard colors. A description is given to the matter with reference to FIG. 16 and FIG. 17.

Figure 16:
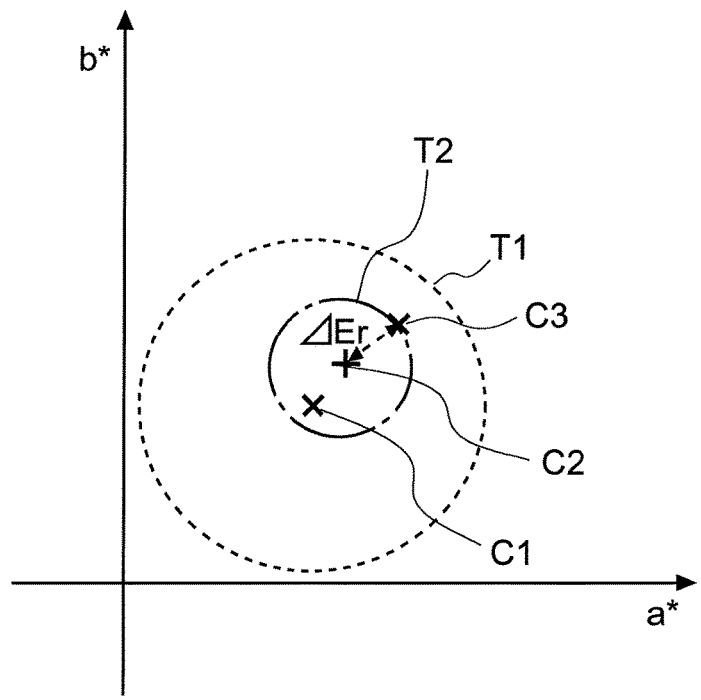
FIG. 16 is a schematic diagram illustrating color matching in a low chroma region in the case where color values of a secondary device are matched with those of a reference device.
Figure 17:
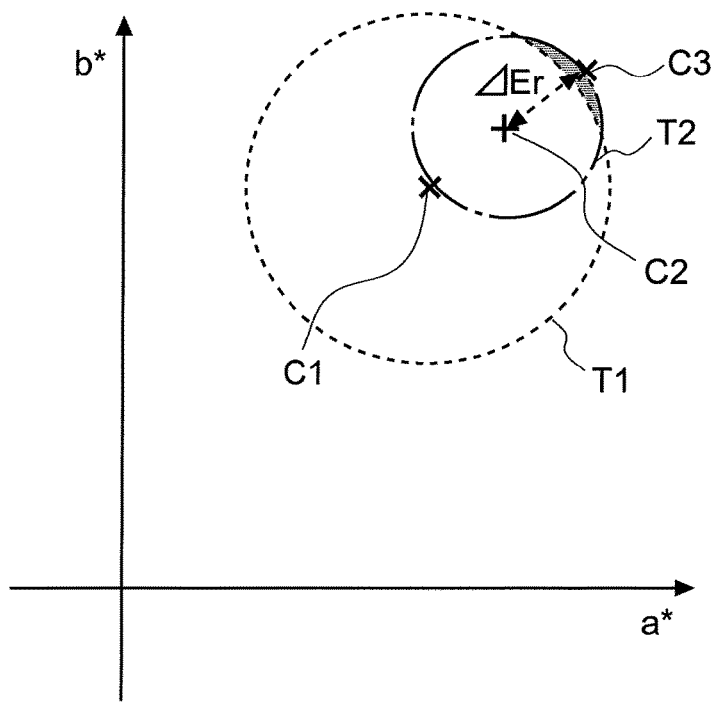
FIG. 17 is a schematic diagram illustrating color matching in a high chroma region in the case where color values of a secondary device are matched with those of a reference device.

Similarly to FIG. 14, FIG. 16 and FIG. 17 are diagrams of the a*b* chromaticity in a low chroma region and a high chroma region, respectively. In these diagrams, C1 (the "+" or plus mark in the diagrams) represents target color values $L_1a_1b_1$ as one standard color, T1 (the circle drawn with a broken line in the diagrams) represents the tolerance of the standard color, T2 (the circle drawn with a one dot chain line in the diagrams) represents the tolerance of the color values of a reference device, and C2 and C3 (the "x" or cross marks in the diagrams) represent the corresponding color values $L_2a_2b_2$ represented by the reference device and corresponding color values $L_3a_3b_3$ represented by a secondary device respectively. In the low chroma region illustrated in FIG. 16, errors of color matching are small, and therefore, as a result of color matching performed for the secondary device by using the color values C2 of the reference device as a target, the color values C3 of the secondary device fall within the tolerance range T1 of the standard color in many cases even if the color matching makes color difference or deviation ($\Delta$Er) between the color values C2 and the color values C3 of the secondary device. On the other hand, in the high chroma region illustrated in FIG. 17, errors of color matching are large, and therefore, as a result of color matching performed for a secondary device by using the color values C2 of the reference device as a target, color difference or deviation ($\Delta$Er) between the color values C2 and the color values C3 of the secondary device arises and the color values C3 of the secondary device can fall out of the tolerance T1 of the standard color (please see the hatched area in FIG. 17).

In other words, performing color matching for each of an offset printing machine (reference device) and a digital printing machine (secondary device) by using standard colors as targets, can cause remarkable perceptible color difference between these printing machines particularly in the low chroma region. Further, performing color matching for an offset printing machine (reference device) by using standard colors as targets and performing color matching for a digital printing machine (secondary device) by using the reference device as a reference, causes large color difference between color values of the secondary device and standard colors particularly in the high chroma region. Accordingly, with any one of the above methods of color matching, it is difficult to match the expressions of the appearance of printed matters output by the reference device and the secondary device and to suppress color difference of each of the printing machines from standard colors.

In view of that an embodiment of the present invention provides a profile creation apparatus configured to perform the following processing. The profile creation apparatus obtains a standard color profile and a reference-device profile. The standard color profile is a profile be used for color conversion of input color values into color values defined according to standard colors. The reference-device profile is created by using measured color values of a printed matter obtained by printing of a first print image with a first printing device, where the first print image is a print image on which color conversion was performed by using the standard color profile. The profile creation apparatus creates a color conversion table to be used for color conversion of input color values into target color values, by combining the standard color profile and the reference-device profile, and stores the color conversion table in a storage unit. The profile creation apparatus performs color conversion on a second print image to be printed by a second printing device, by using the color conversion table stored in the storage unit, and outputs to the second printing device the second print image on which the color conversion was performed. To create the color conversion table, the profile creation apparatus obtains the target color values by adding the standard color profile and the reference-device profile with being weighted by using a specific factor such that a weighed ratio of the standard color profile increases as chroma calculated from the input color values of the color conversion table increases, for the values of chroma which fall within a predetermined chroma region.

Employing such a profile creation apparatus enables the following color matching to be used in a printing system including a plural printing devices, the profile creation apparatus, a client terminal and a color measurement device. When printing is performed with printing devices in the printing system including a plural printing devices, the profile creation apparatus, a client terminal and a color measurement device, color matching is firstly performed, by using a standard color profile, for one of the printing devices (a printing device which is desired to represent colors conforming to standard colors, for example, an offset printing machine). The standard color profile is a target profile to be used for color conversion of input color values into color values defined according to the standard colors. This color matching is performed by using a standard color profile so as to match colors represented by the printing device with standard colors as targets. Then, the printing device prints an image of a printed matter (color chart) on which the color conversion was performed by using the standard color profile. Then, the client terminal causes the color measurement device to measure colors of the printer matter (color chart) and obtains measured color values of the printed matter. On the basis of the measured color values obtained, the client terminal creates a target profile (a target profile for a reference device, or a reference-device profile) to be used for color conversion of input color values into target color values. Then, the profile creation apparatus creates a color conversion table to be used for color conversion of input color values into target color values by combining the standard color profile and the reference-device profile, and stores the color conversion table in a storage unit. The profile creation apparatus uses the color conversion table stored in a storage unit, and performs color matching on a print image to be printed by another printing device (a printing device for which color adjustment of printed matters is desired, for example, a digital printing machine). This color matching is performed so as to match colors of the print image in a high chroma region with standard colors as targets and match colors of the print image in a low chroma regions with color values of the reference device as targets. In concrete terms, in the creation of the color conversion table, the profile creation apparatus obtains the target color values by calculating a weighted sum of the standard color profile and the reference-device profile by using a specific factor such that a weighed ratio of the standard color profile increases as chroma calculated from the input color values of the color conversion table increases, for the values of chroma which fall within a predetermined chroma region. For example, the profile creation apparatus makes the weighted ratio of the standard color profile greater than the weighted ratio of the reference-device profile in a high chroma region and makes the weighted ratio of the reference-device profile greater than the weighted ratio of the standard color profile in a low chroma region. Herein, the high chroma region is a region where the chroma calculated from the input color values of the color conversion table has relatively low values (in other words, a region where the values of the chroma calculated from the input color values of the color conversion table fall within a certain range), the low chroma region is a region where the chroma calculated from the input color values of the color conversion table has relatively high values (in other words, a region where the values of the chroma calculated from the input color values of the color conversion table are smaller than the certain range).

The above-described color matching can offer both abilities to match colors numerically with standard colors and abilities to match colors perceptually with colors of a reference device.

EXAMPLES

Figure 3A:
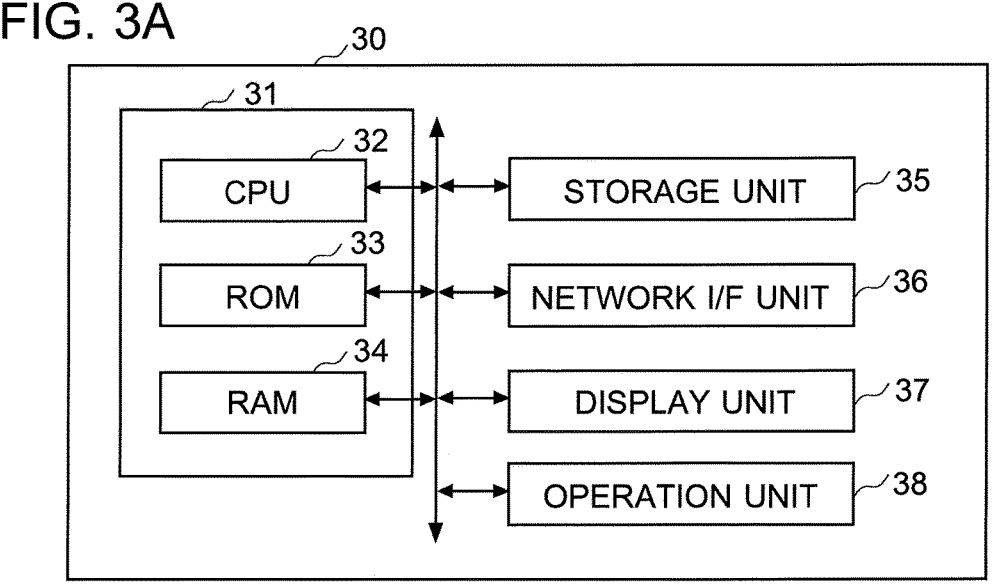
FIGS. 3A and 3B each is a block diagram illustrating an example of the constitution of a printer controller according to one embodiment of the present invention.
Figure 3B:
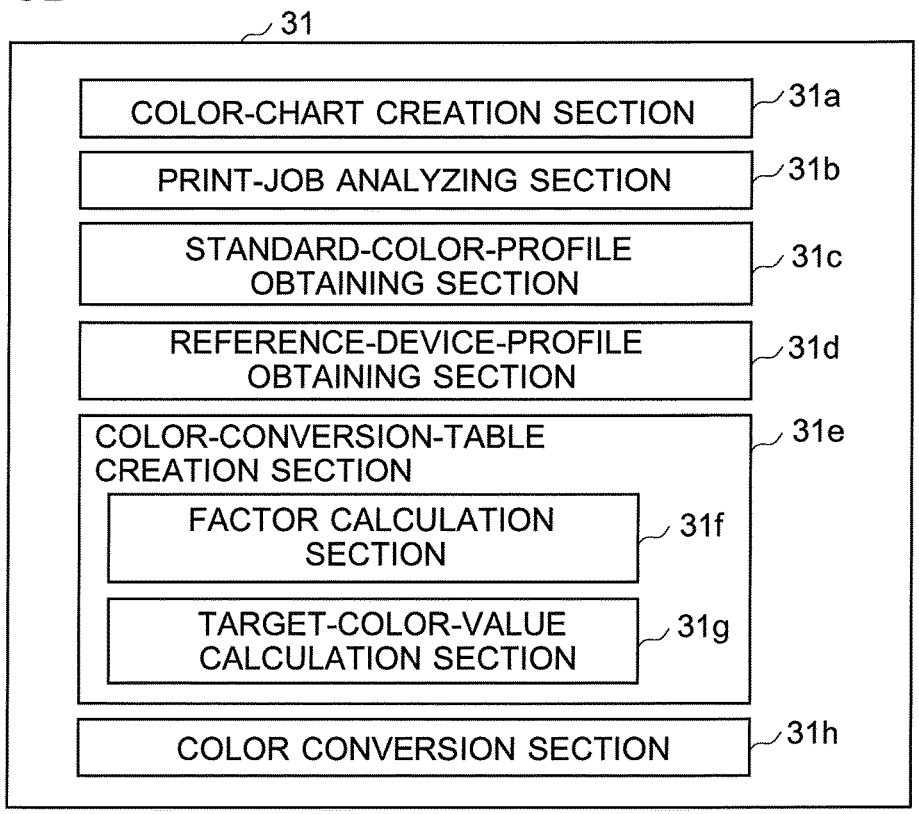
Figure 4:
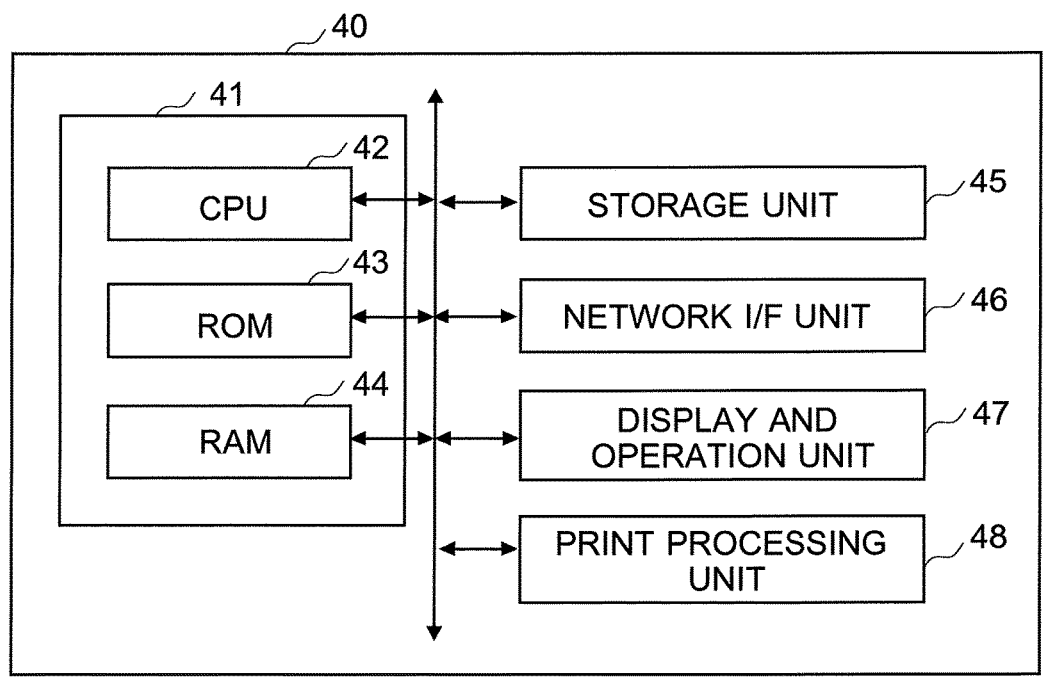
FIG. 4 is a block diagram illustrating an example of the constitution of an image forming apparatus according to one embodiment of the present invention.
Figure 5:
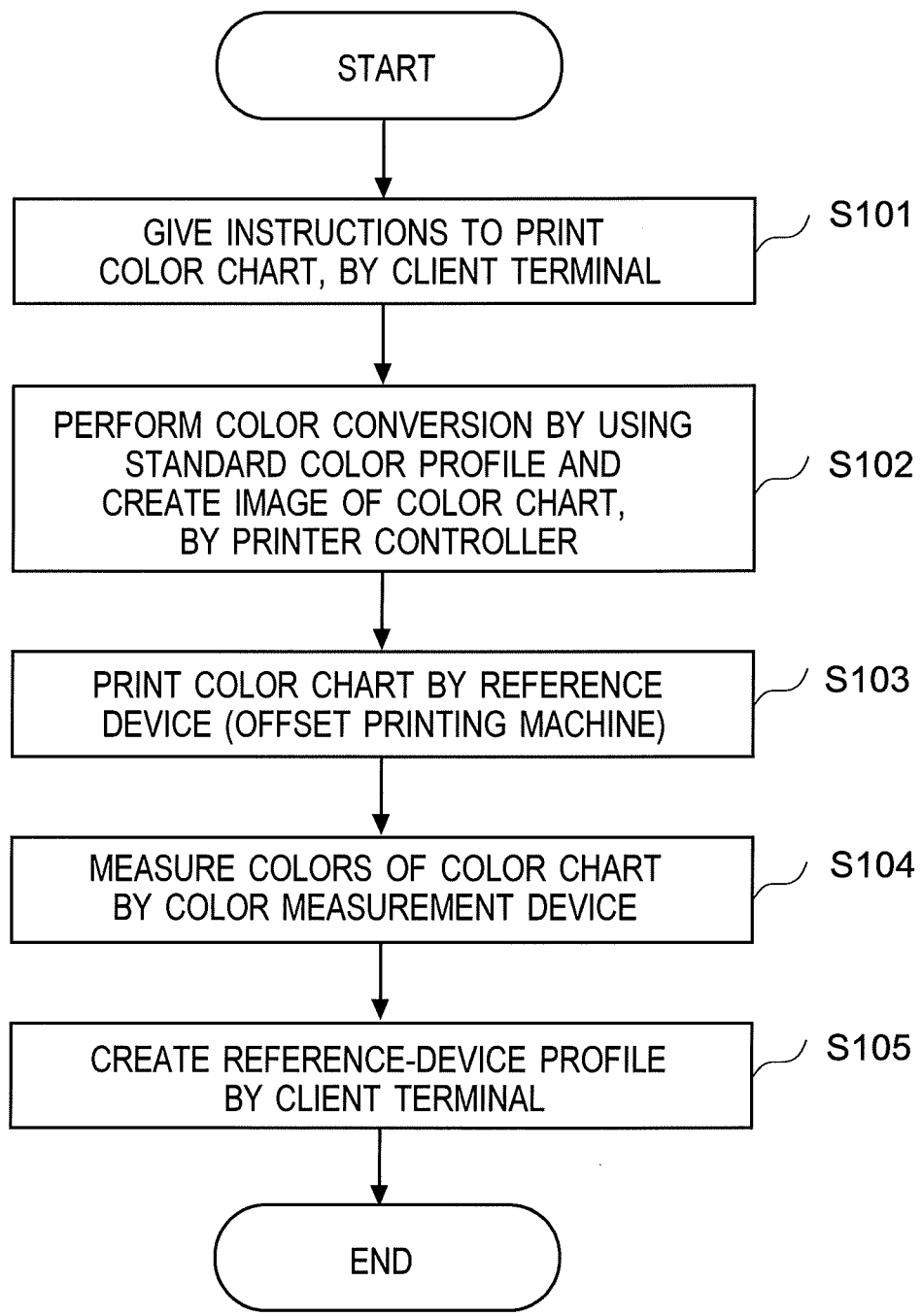
FIG. 5 is a flowchart illustrating an example of the operation (the creation procedure of a reference-device profile) of the printing system according to one embodiment of the present invention.
Figure 6:
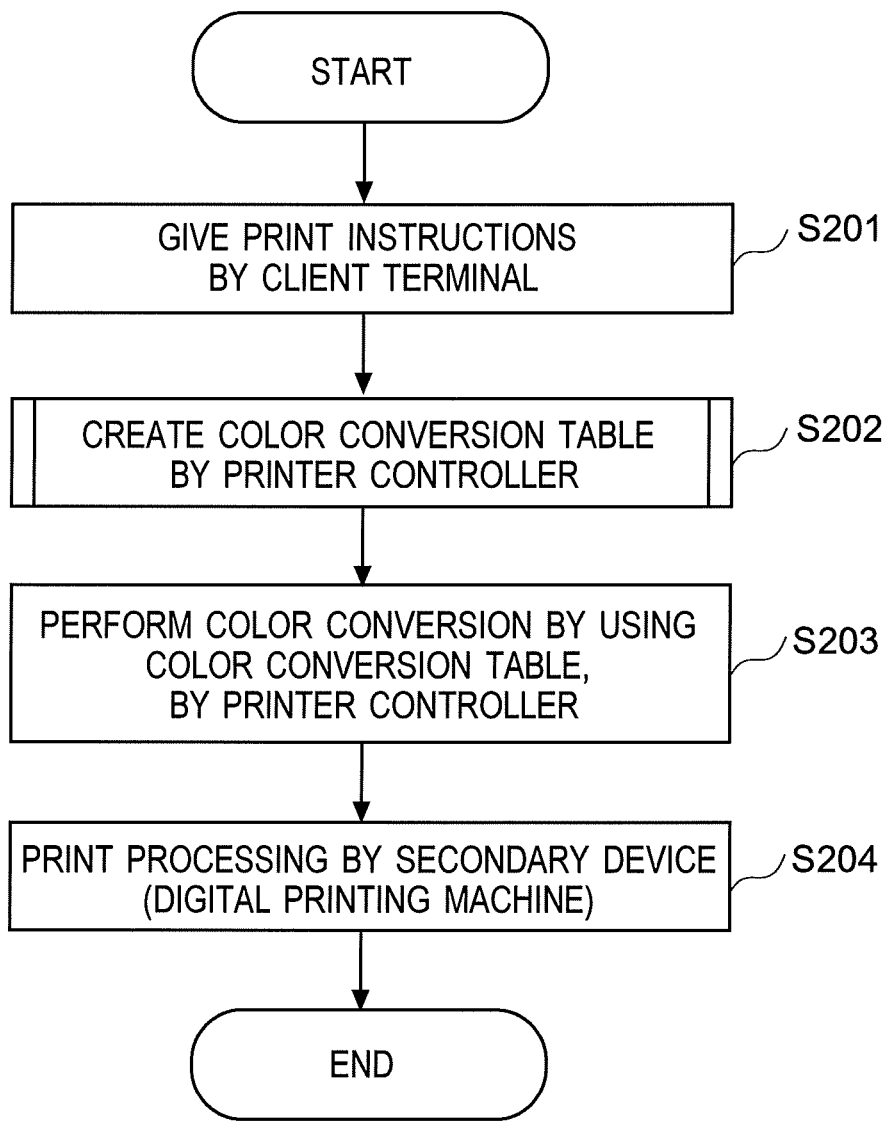
FIG. 6 is a flowchart illustrating an example of the operation (a color matching procedure for a secondary device) of the printing system according to one embodiment of the present invention.
Figure 7:
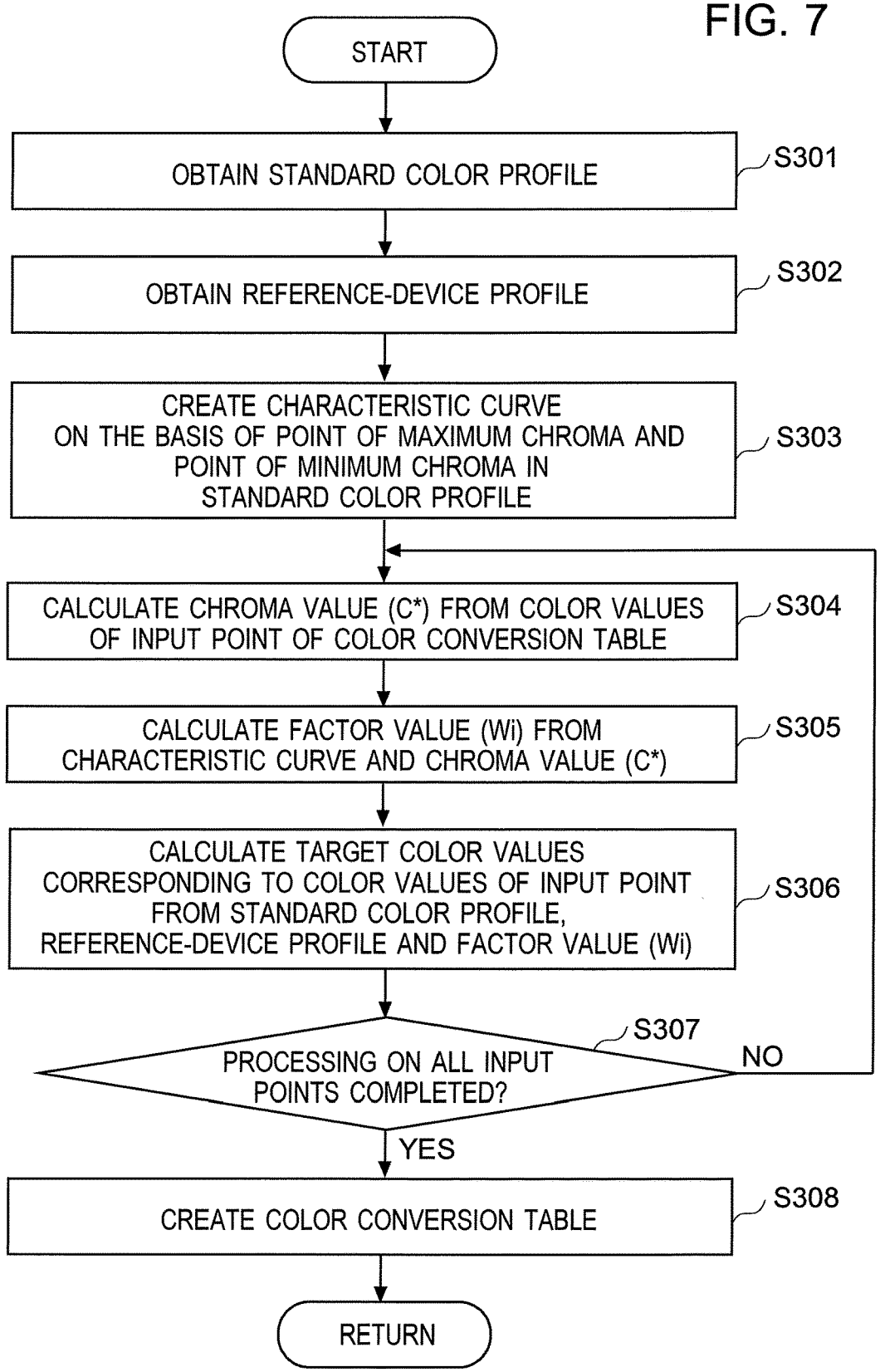
FIG. 7 is a flowchart illustrating an example of the operation (the creation procedure of a color conversion table) of a printer controller according to one embodiment of the present invention.

In order to describe the above-mentioned embodiments of the present invention in more detail, a description is given to a profile creation apparatus, a non-transitory computer-readable storage medium storing a profile creation program and a color matching method according to one example of the present invention with reference to FIG. 1 to FIG. 13. FIG. 1 is a schematic diagram illustrating an example of the constitution of a printing system of the present example. FIGS. 2A and 2B, FIGS. 3A and 3B and FIG. 4 are block diagrams illustrating an example of the constitutions of a client terminal, a printer controller, and an image forming apparatus of the present example, respectively. FIG. 5 to FIG. 7 each is a flowchart illustrating an example of the operation of the printing system of the present example. FIG. 8 to FIG. 13 each is a diagram illustrating an example of a characteristic curve used for setting a factor.

As illustrated in FIG. 1, the printing system 10 of the present example includes at least one client terminal 20, a printer controller 30, a plurality of image forming apparatuses 40 (one or more offset printing machines 40a each serving as a reference device and one or more digital printing machines 40b each serving as a secondary device in the present example) and a color measurement device 50. These apparatuses in the printing system 10 are communicably connected to each other through a communication network 60, where example of the communication network 60 include a LAN (Local Area Network) and WAN (Wide Area Network) defined by specifications, such as Ethernet, Token Ring and FDDI (Fiber-Distributed Data Interface). The printer controller 30 and the image forming apparatuses 40 may be communicably connected to each other with an exclusive line supporting, for example, PCI (Peripheral Component Interconnect) communication. Hereinafter, each apparatus will be described.

Figure 2A:
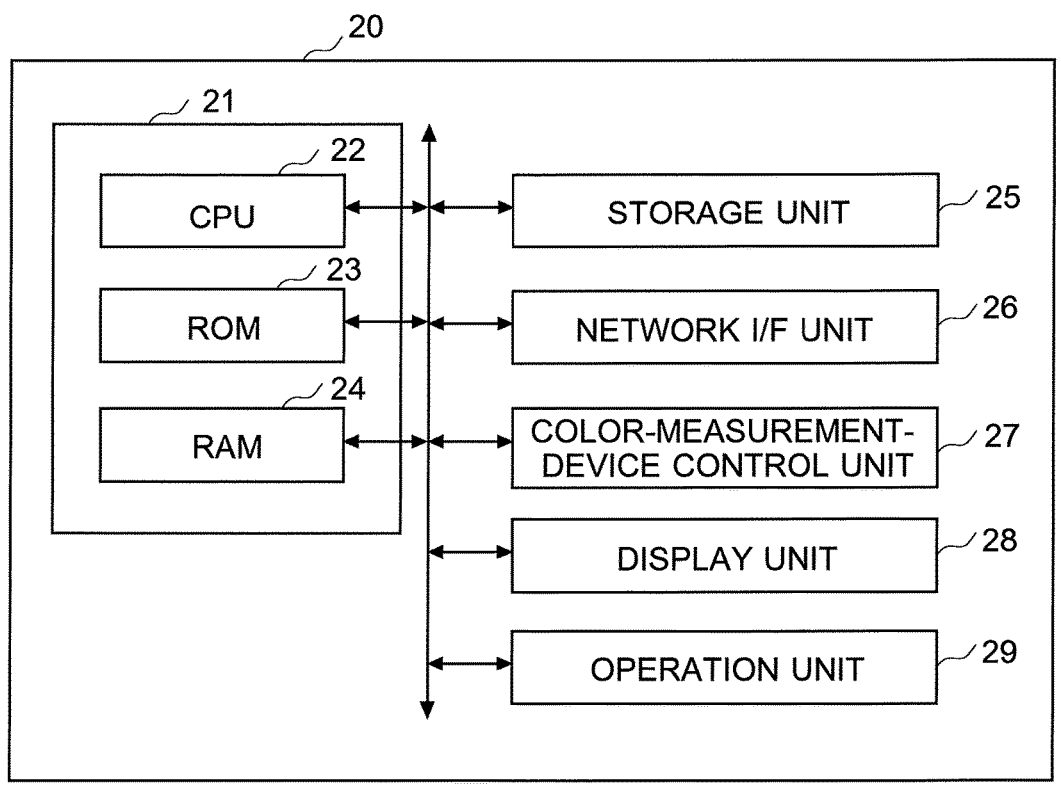
FIGS. 2A and 2B each is a block diagram illustrating an example of the constitution of a client terminal according to one embodiment of the present invention.

Client Terminal:

The client terminal 20 is a work station which can create and edit a print job. The client terminal 20, as illustrated in FIG. 2A, includes a control unit 21, a storage unit 25, a network interface (I/F) unit 26, a color-measurement-device control unit 27, a display unit 28 and an operation unit 29.

Figure 2B:
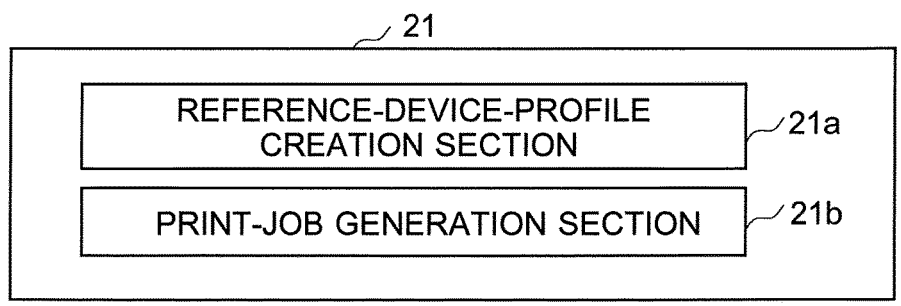

The control unit 21 includes a CPU (Central Processing Unit) 22 and memories, such as a ROM (Read Only Memory) 23 and a RAM (Random Access Memory) 24. The CPU 22 reads out control programs stored in the ROM 23 or the storage unit 25, loads the control programs onto RAM 24, and executes the control programs, thereby controlling the overall operations of the client terminal 20. The control unit 21, as illustrated in FIG. 2B, works as a reference-device-profile creation section 21a and a print-job generation section 21b.

The reference-device-profile creation section 21a instructs the printer controller 30 to create a reference-device profile. Then, the reference-device-profile creation section 21a obtains measured color values of a color chart and creates a reference-device profile (a target profile for a reference device). The measured color values are given by measuring, with the color measurement device 50, colors of a color chart (a color chart on which color matching was performed by using a standard color profile) printed by a reference device (offset printing machine 40a). The reference-device-profile creation section 21a further outputs the created reference-device profile to the printer controller 30. The color chart may be printed by one of the plurality of image forming apparatuses 40 set or defined beforehand as the reference device, or may be obtained out of color charts printed by the plurality of image forming apparatuses 40. In the latter case, the reference-device profile may be created by using the measured color values of the color chart chosen as follows. On the basis of measured color values of color charts printed by the image forming apparatuses 40, one of the image forming apparatuses 40 from which measured color values closest to the color values of standard colors can be obtained, may be chosen or defined as a reference device (or one of the image forming apparatuses 40 may be chosen as a reference device on the basis of the average or median of measured color values of a color chart printed by each of the image forming apparatuses 40). By using the measured color values of a color chart printed by the image forming apparatus 40 chosen, the reference-device-profile creation section 21a may create the reference-device profile. Further, the reference-device-profile creation section 21a may create a reference-device profile by using the measured color values of a color chart printed by each of the image forming apparatuses 40, may associate the created reference-device profiles together with information of the respective image forming apparatuses 40, and may output the reference-device profiles and the information to the printer controller 30.

The print-job generation section 21b converts original data to be printed, into a print job in a language that the image forming apparatuses 40 can interpret and sends the print job to the printer controller 30 to instruct print processing, where examples of the print job include PDL (Page Description Language) data written in page description languages, such as PJL (Printer Job Language), PS (PostScript) and PCL (Printer Control Language); and PDF (Portable Document Format) data. The print job includes a description of settings of color matching (settings about a standard color profile and a reference-device profile to be used for color conversion).

The storage unit 25 includes a memory, such as a HDD (Hard Disk Drive), a SSD (Solid State Drive) or the like, which stores programs which when being executed causes the CPU 22 to control components of the client terminal 20, information about processing and functions of the client terminal 20, target profiles created by the reference-device-profile creation section 21a, print jobs generated by the print-job generation section 21b and other data.

The network I/F unit 26 includes a NIC (Network Interface Card) and/or a modem. The network I/F unit 26 communicably connects the client terminal 20 to the communication network 60, to send instruction information and a print job to the printer controller 30 and receive measured color values from the color measurement device 50.

The color-measurement-device control unit 27 controls the color measurement device 50 to measure colors of a color chart output by a reference device (offset printing machine 40a), and obtains the measured color values of the color chart.

The display unit 28 includes a display like a LCD (Liquid Crystal Display) or an OEL (organic electroluminescence)

display, and displays a setup screen for color matching to be performed on creation of a reference-device profile, a print setup screen for generating a print job and others.

The operation unit 29 includes hardware devices, such as a mouse, a keyboard and hardware switches, thorough which a user can instruct various relating to settings of color matching to be performed on creation of a reference-device profile and print settings to be used for generating a print job.
Printer Controller:

The printer controller 30 is a profile creation apparatus, and is configured to perform rasterization and color conversion in accordance with a print job received from the client terminal 20 and send the resulting data to the offset printing machine 40a and the digital printing machine 40b. On performing the processing, the printer controller 30 performs color conversion based on the settings of the color matching which were set on each client terminal 20. The printer controller 30, as illustrated in FIG. 3A, includes a control unit 31, a storage unit 35 and a network interface (I/F) unit 36, and optionally includes a display unit 37 and an operation unit 38.

The control unit 31 includes a CPU 32 and memories, such as, a ROM 33 and a RAM 34. The CPU 32 reads out control programs stored in the ROM 33 or the storage unit 35, loads the control programs onto RAM 34, and executes the control programs, thereby controlling the overall operations of the printer controller 30. The control unit 31, as illustrated in FIG. 3B, works as a color-chart creation section 31a, a print-job analyzing section 31b, a standard-color-profile obtaining section 31c, a reference-device-profile obtaining section 31d, a color-conversion-table creation section 31e and a color conversion section 31h.

The color-chart creation section 31a creates an image of a color chart for creating a reference-device profile, in accordance with instructions received from the client terminal 20, and instructs the reference device (offset printing machine 40a) to print the image of the color chart. On the image of the color chart, color conversion is performed by using the standard color profile.

The print-job analyzing section 31b analyzes a print job received from the client terminal 20 and rasterizes data of pages in the print job to create image data. Further, the print-job analyzing section 31b determines settings of color matching given by the client terminal 20 (settings about the standard color profile and the reference-device profile to be used for color conversion), and outputs the determined settings of the color matching to the standard-color-profile obtaining section 31c, the reference-device-profile obtaining section 31d and the color-conversion-table creation section 31e.

In accordance with the settings of color matching given by the client terminal 20, the standard-color-profile obtaining section 31c obtains the standard color profile from the storage section 35, a cloud server on the communication network 60, or the other device, where the standard color profile is a target profile to be used for color conversion that converts input color values into color values defined according to colors conforming to color standards (standard colors) such as "Japan Color", "Fogra", and "GRACoL".

In accordance with the settings of color matching given by the client terminal 20, the reference-device-profile obtaining section 31d obtains, from the storage section 35 or other device, the reference-device profile to be used for creating a color conversion table. On finding plural reference-device profiles corresponding to plural image forming apparatuses 40 stored, the reference-device-profile obtaining section 31d obtains one of the reference-device profiles corresponding to one of the image forming apparatuses 40 which output a color chart the measured color values of which are closest to the color values of the standard colors among those of color charts output by the plural image forming apparatuses 40 (alternatively, one of the image forming apparatuses 40 chosen on the basis of the average or median of measured color values of a color chart output by each of the plural image forming apparatuses 40).

The color-conversion-table creation section 31e creates a color conversion table by combining the standard color profile and the reference-device profile with being weighted, and stores the created color conversion table in the storage unit 35, where the color conversion table is a table to be used for color conversion that converts colors represented by a secondary device (digital printing machine 40b) into target colors. Such a color conversion table is a look-up table (profile) which associates input color values with corresponding target color values. As mentioned later, the color conversion table is prepared such that, in a process of calculating the target color values by adding the standard color profile and the reference-device profile with being weighted on the basis of a specific factor, the weighted ratio of the standard color profile, which is given by the value of the factor, increases with an increase of chroma calculated from the input color value of the color conversion table, in a predetermined chroma region. In concrete terms, the color conversion table is prepared so as to enable color matching by using color values close to those provided by the standard color profile as the target color values (by using the weighted ratio of the standard color profile greater than that of the reference-device profile) in a high chroma region and by using color values close to those provided by the reference-device profile as the target color values (by using the weighted ratio of the reference-device profile greater than that of the standard color profile) in a low chroma region. Herein, the high chroma region is the region where values of chroma calculated from input color values of the color conversion table fall within a certain range and the low chroma region is the region where values of chroma calculated from the input color values are lower than the values of chroma in the high chroma region. The color-conversion-table creation section 31e includes a factor calculation section 31f and a target-color-value calculation section 31g.

The factor calculation section 31f creates a characteristic curve which defines the relation between values of chroma calculated from the input color values of the color conversion table and values of the specific factor. By using the calculated characteristic curve, the factor calculation section 31f calculates the target color values. In concrete terms, the factor calculation section 31f creates a characteristic curve which associates values of chroma (C*) with values of the factor (Wi) which defines how to calculate target color values by adding the standard color profile and the reference-device profile with what weighted ratios. Subsequently, on the basis of the created characteristic curve, the factor calculation section 31f calculates a value of the factor (Wi) corresponding to a value of chroma calculated from input color values (L*a*b* values) of each input color. Herein, the value of Wi indicates the weighted ratio of the reference-device profile and the value of (1−Wi) indicates the weighted ratio of the standard color profile. The chroma C* of input color values (L*a*b* values) can be calculated by the following formula.

$$C^* = ((a^*)^2 + (b^*)^2)^{1/2}$$

Figure 8:
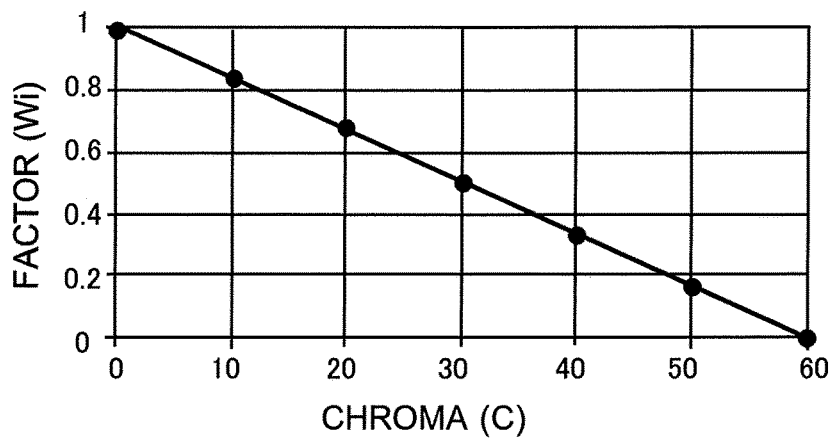
FIG. 8 is a diagram illustrating an example of a characteristic curve used for setting a factor.
Figure 9:
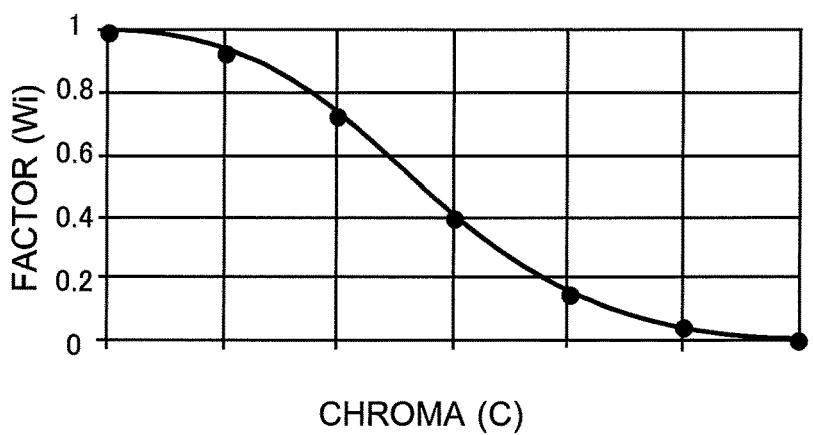
FIG. 9 is a diagram illustrating another example of a characteristic curve used for setting a factor.
Figure 10:
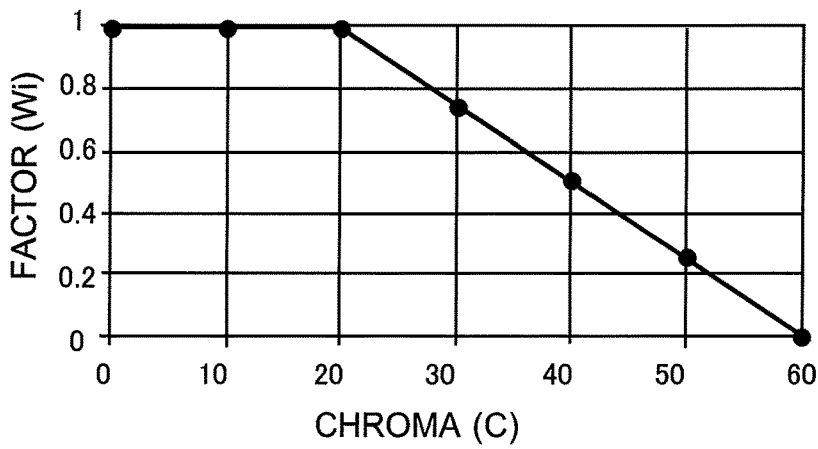
FIG. 10 is a diagram illustrating another example of a characteristic curve used for setting a factor.
Figure 11:
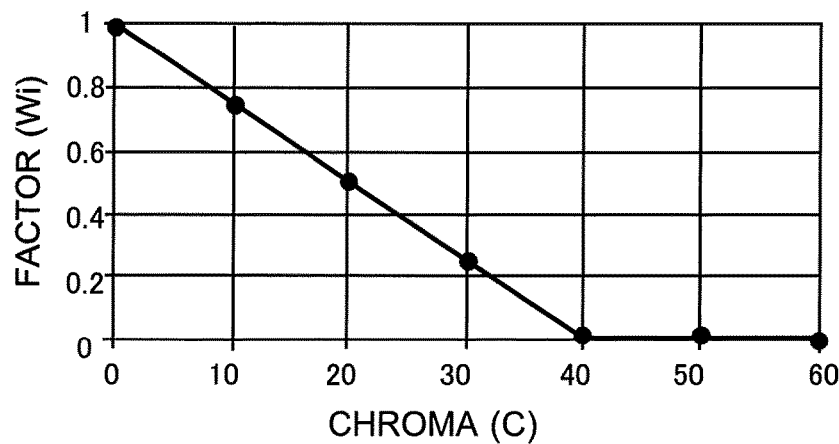
FIG. 11 is a diagram illustrating another example of a characteristic curve used for setting a factor.
Figure 12:
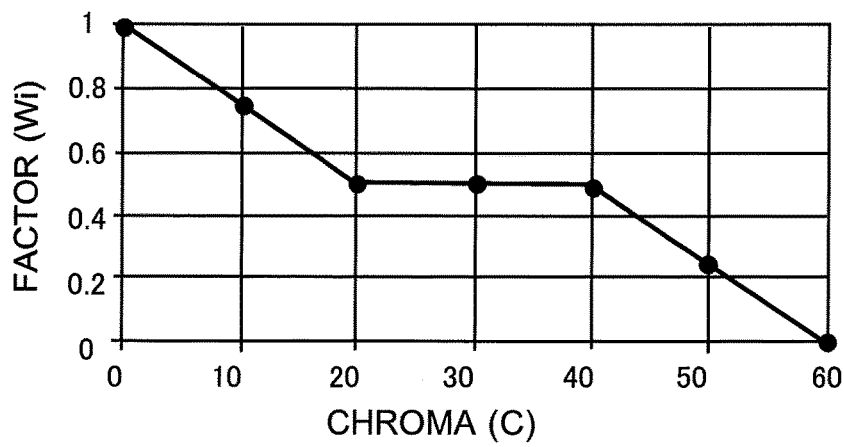
FIG. 12 is a diagram illustrating another example of a characteristic curve used for setting a factor.
Figure 13:
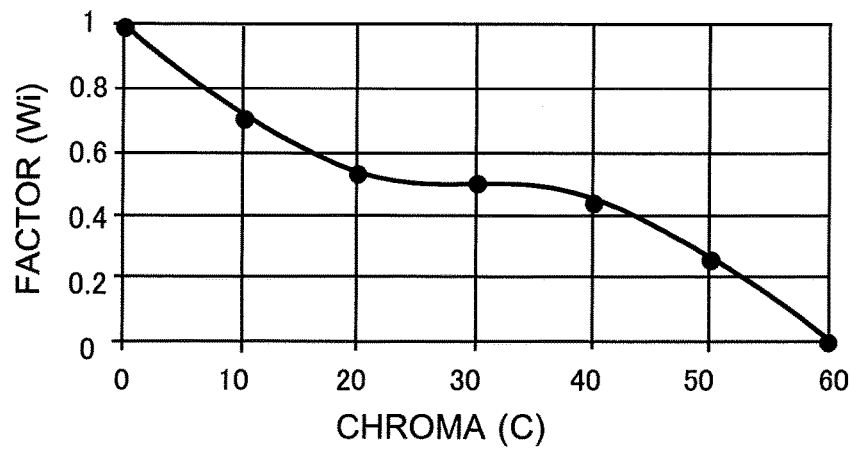
FIG. 13 is a diagram illustrating another example of a characteristic curve used for setting a factor.

The characteristic curve can be created by determining the point of maximum chroma and the point of minimum chroma in the standard color profile and by connecting the two determined points. The characteristic curve may have an arbitrary form between the two point, as far as the characteristic curve gives the maximum factor value (for example, "1") at the point where the chroma of input color values has the minimum value and gives the minimum factor value (for example, "0") at the point where the chroma of input color values has the maximum value. For example, as illustrated in FIG. 8, the two points may be connected with a straight line represented by a linear function. Alternatively, as illustrated in FIG. 9, the two points may be connected with a curve represented by a higher order function more than the second order, or may be connected with a curve represented by an exponential function. Further, the characteristic curve may include a region where the characteristic curve gives constant factor values for varying chroma values (that is, the inclination of the curve becomes zero). For example, as illustrated in FIG. 10, the characteristic curve may include the low chroma region where the curve gives constant factor values; or as illustrated in FIG. 11, the characteristic curve may include the high chroma region where the curve gives constant factor values. As other examples, as illustrated in FIG. 12 and FIG. 13, the characteristic curve may include the middle chroma region where the curve gives constant factor values; or the characteristic curve may have a step form. FIG. 8 to FIG. 13 each illustrates a curve such that the factor value decreases with an increase of the chroma value, but such a curve may include a chroma region where the factor value increases with an increase of the chroma value.

The target-color-value calculation section 31g calculates target color values corresponding to input color values by combining the standard color profile and the reference-device profile in accordance with the factor value calculated by the factor calculation section 31f. Then, a color conversion table is created by associating input color values and corresponding target color values. In concrete terms, target color values are given by the following equations, where target color values are $L_3$, $a_3$, and $b_3$, color values of the standard color profile are $L_1$, $a_1$, $b_1$, color values of the reference-device profile are $L_2$, $a_2$, $b_2$, and the factor value is Wi.

$$L_3 = L_1 \times (1-Wi) + L_2 \times Wi$$

$$a_3 = a_1 \times (1-Wi) + a_2 \times Wi$$

$$b_3 = b_1 \times (1-Wi) + b_2 \times Wi$$

In the case of giving print instructions to the reference device (offset printing machine 40a), the color conversion section 31h performs color conversion on a print image to be printed by the reference device, by using the standard color profile and then outputs to the reference device (offset printing machine 40a) the print image on which the color conversion has been performed. In the case of giving print instructions to the secondary device (digital printing machine 40b), the color conversion section 31h performs color conversion on a print image to be printed by the secondary device, by using the color conversion table which has been created by the color-conversion-table creation section 31e and stored in the storage unit 35, and then outputs to the secondary device (digital printing machine 40b) the print image on which the color conversion has been performed. Further, the color conversion section 31h may compare the standard color profile with the reference-device profile, and judge whether the color gamut of the reference device (offset printing machine 40a) is included within the color gamut of the standard colors. On judging that the color gamut of the reference device (offset printing machine 40a) is included within the color gamut of the standard colors, the color conversion section 31h may perform the color conversion by using one of the reference-device profile and the standard color profile. On judging that the color gamut of the reference device (offset printing machine 40a) is not included within the color gamut of the standard colors, the color conversion section 31h may perform the color conversion by using the color conversion table.

The standard-color-profile obtaining section 31c, the reference-device-profile obtaining section 31d, the color-conversion-table creation section 31e, and the color conversion section 31h may be constituted as hardware devices. Alternatively, the standard-color-profile obtaining section 31c, the reference-device-profile obtaining section 31d, the color-conversion-table creation section 31e, and the color conversion section 31h may be provided by a profile creation program which causes the control unit 31 to function as these sections (which causes the CPU 32 to perform processing to obtain the standard color profile, processing to obtain the reference-device profile, processing to create the color conversion table and processing to perform color conversion) when being executed by CPU 32. That is, the control unit 31 may be configured to serve as the standard-color-profile obtaining section 31c, the reference-device-profile obtaining section 31d, the color-conversion-table creation section 31e, and the color conversion section 31h, when CPU 32 executes the profile creation program.

The storage section 35 includes a memory, such as a HDD, a SSD (Solid State Drive) or the like, which stores programs which when being executed causes the CPU 32 to control components of the printer controller 30, print jobs received from the client terminal 20, the standard color profile, the reference-device profile, the color conversion table and other data.

The network I/F section 36 includes a NIC and/or a modem. The network I/F unit 36 communicably connects the printer controller 30 to the communication network 60, to receive a print job and the reference-device profile from the client terminal 20 and send a print job to the image forming apparatus 40.

Image Forming Apparatus:

Image forming apparatuses 40 each is a printing device which performs printing in accordance with print instructions sent from the printer controller 30. Plural image forming apparatuses 40 included in the printing system 10 of the present example include the offset printing machine 40a mainly used for high volume printing and the digital printing machine 40b mainly used for low volume printing. These image forming apparatuses 40 can be managed as groups, and image forming apparatuses 40 belonging to the same group can be made as a target of profile creation control of the present example. Each of the image forming apparatuses 40, as illustrated in FIG. 4, includes a control unit 41, a storage unit 45, a network interface (I/F) unit 46, a display and operation unit 47 and a print processing unit 48.

The control unit 41 includes a CPU 42 and memories, such as, a ROM 43 and a RAM 44. The CPU 42 reads out control programs stored in the ROM 43 or the storage unit 45, loads the control programs onto RAM 44, and executes the control programs, thereby controlling the overall operations of the image forming apparatus 40.

The storage unit 45 includes a memory, such as a HDD, a SSD or the like, which stores programs which when being executed causes the CPU 42 to control components of the image forming apparatus 40, information about processing and functions of the image forming apparatus 40 and other data.

The network I/F section 46 includes a NIC and/or a modem. The network I/F unit 46 communicably connects the image forming apparatus 40 to the communication network 60, to receive image data on which the print controller 30 performed image processing.

The display and operation unit 47 includes a device, such as a touch panel which includes a display unit and a pressure-sensitive operation unit (a touch sensor) including transparent electrodes arranged on the display unit in a lattice shape. The operation and display unit 47 displays various screens about print processing so as to allow a user to perform various operations relating to print processing.

The print processing unit 48 executes print processing based on image data received from the printer controller 30. If the image forming apparatus 40 is the offset printing machine 40a, the print processing unit 48 includes a printing section, a sheet feeding section (feeder section), and a sheet delivering section (delivery section). In the above constitution, the printing section includes a plate cylinder provided with a plate on which an oleophilic layer is formed so as to correspond to an image; an ink roller to coat CMYK color inks on the plate; a blanket to which inks on the plate are transferred; and a pressure cylinder to transfer inks on the blanket to a sheet. Alternatively, if the image forming apparatus 40 is the digital printing machine 40b, the print processing unit 48 includes an image forming section, an intermediate belt, a secondary transfer roller, a fixing section, and a conveying section. In the above constitution, the image forming section forms toner images in CMYK colors and includes a photoreceptor drum, an exposing section which performs exposure processing by irradiating the photoreceptor drum with a laser beam based on image data, a developing section, an electrically charging section, a photoreceptor cleaning section, and a primary transfer roller. The intermediate belt is rotated by rollers and functions as an intermediate transfer body to convey toner images formed by the image forming section to a sheet. The secondary transfer roller transfers toner images formed on the intermediate belt to a sheet. The fixing section fixes toner images transferred to the sheet. The conveying section includes a sheet feeding roller to convey sheets, a registration roller, a loop roller, a reverse roller, and a sheet delivering roller.

Color Measurement Device:

The color measurement device 50 is a color measurement device or a color measurement instrument employing spectrophotometry, which can measure the light intensity at each wavelength. The color measurement device 50 measures colors of a color chart output by the image forming apparatus 40, and outputs measured color values (L*a*b* values, XYZ values, etc.) of the color chart.

It should be noted that FIG. 1 to FIG. 4 each shows an example of the printing system 10 of the present example for illustrative purpose only, and the constitution control of each apparatus in the system can be modified appropriately as long as the apparatuses in the printing system can realize the color matching method of the present example. For example, in the printing system 10 in FIG. 1, the printer controller 30 and each of the image forming apparatuses 40 are provided as separate apparatuses. However, the printer controller 30 may be incorporated in any one of the image forming apparatuses 40 (for example, offset printing machine 40a).

Hereinafter, the operation of the printing system 10 of the present example will be described. First, the creation procedure of a reference-device profile is described with reference to the flowchart illustrated in FIG. 5.

The control unit 21 (reference-device-profile creation section 21a) of the client terminal 20 instructs the printer controller 30 to create a reference-device profile (gives print instructions to print a color chart for creating a reference-device profile) in accordance with user's operations via the operation unit 29 (S101). The control unit 31 (color-chart creation section 31a) of the printer controller 30, on receiving instructions to create a reference-device profile, creates an image of a color chart for creating a reference-device profile by performing color conversion on the image of the color chart by using a standard color profile, and gives instructions to print the color chart to a reference device (in this example, offset printing machine 40a) (S102). In place of the printer controller 30, the client terminal or another apparatus may perform the above-described color conversion by using a standard color profile, for creating the color chart to be used for creating a reference-device profile, and give the above print instructions to the reference device (offset printing machine 40a).

The reference device (offset printing machine 40a) prints out a color chart for creating a reference-device profile in accordance with the instructions of the printer controller 30 (S103). Then, a sheet of the color chart for creating a reference-device profile is loaded on the color measurement device 50 connected to the client terminal 20. Successively, in accordance with the control of the color-measurement-device control unit 27 of the client terminal 20, the color measurement device 50 measures colors of color patches printed on the color chart for creating a reference-device profile and outputs measured color values (color values) to the client terminal 20 (S104).

The control unit 21 (reference-device-profile creation section 21a) of the client terminal 20 creates a reference-device profile by using the measured color values (color values) obtained from the color measurement device 50, and sends the profile to the printer controller 30 (S105). Then, the printer controller 30 stores and registers the received reference-device profile in the storage unit 35.

Next, with reference to the flowchart illustrated in FIG. 6, a description is given to a color matching procedure to be performed on executing print processing on the secondary device (in this example, digital printing machine 40b).

The control unit 21 (print-job creation section 21b) of the client terminal 20 creates a print job to instruct the secondary device to output printed matters, in accordance with user's operations given through the operation unit 29, and sends the created print job to the printer controller 30 to give print instructions (S201). In this process, the control unit 21 sets up the standard color profile and reference-device profile which are used for color conversion, and notifies the settings about the profiles to the printer controller 30.

The control unit 31 of the printer controller 30 performs printing preparation in response to receiving print instructions from the client terminal 20. In concrete terms, the control unit 31 (print-job analyzing section 31b) analyzes the print job, and performs rasterization. Successively, the control unit 31 (color-conversion-table creation section 31e) creates a color conversion table from the prepared standard color profile and reference-device profile which were set up in the client terminal 20 (S202). The details of this step are mentioned later.

Then, the control unit 31 (color conversion section 31h) performs color conversion (color matching) for the rasterized print job by using the created color conversion table, and gives print instructions to the secondary device (digital printing machine 40b) (S203). Successively, the secondary device (digital printing machine 40b) performs print processing in accordance with the instructions given by the printer controller 30 (S204).

Next, the creation procedure of the color conversion table at the above step S202 is described. The CPU 32 reads out a profile creation program stored in the ROM 33 or the storage unit 35, loads the profile creation programs onto RAM 34, and executes the profile creation programs, thereby executing the processing of each step in the flowchart of FIG. 7.

First, the control unit 31 (standard-color-profile obtaining section 31c) of the printer controller 30 obtains the standard color profile from the storage section 35 or another device, in accordance with the settings of the color matching notified from the client terminal 20 (S301). Successively, the control unit 31 (reference-device-profile obtaining section 31d) obtains the reference-device profile from the storage unit 35 or another device, in accordance with the settings of the color matching notified from the client terminal 20 (S302).

Next, the control unit 31 (color-conversion-table creation section 31e or factor calculation section 31f) determines a point of maximum chroma and a point of minimum chroma on the basis of color values (input color values) of each input point of the standard color profile, and creates a characteristic curve connecting the two points such that the factor (Wi) has the minimum value at the point of maximum chroma and the factor (Wi) has the maximum value at the point of minimum chroma (S303). As mentioned above, the characteristic curve may form a straight line connecting the two points as illustrated in FIG. 8, a curve line connecting the two points as illustrated in FIG. 9, a combination of two or more straight lines connecting the two points, a combination of a straight line and a curve line connecting the two points, or a line in a step form connecting the two points. Further, the characteristic curve may have an arbitrary form as far as the characteristic curve includes at least a chroma region where the factor gradually decreases with an increase of the chroma (in other words, a chroma region where the weighed ratio of the standard color profile increases as the chroma increases). For example, the characteristic curve may further include a chroma region where the factor has constant values (the inclination of the curve becomes zero) for varying chroma values, as illustrated in FIG. 10 to FIG. 13.

Next, the control unit 31 (color-conversion-table creation section 31e or factor calculation section 31f) designates one of input points of the color conversion table sequentially, calculates a chroma value (C*) from the color values of the designated input point (S304), and calculates a factor value (Wi) from the characteristic curve created at the step S303 and the chroma value (C*) calculated at the step S304 (S305).

Next, the control unit 31 (color-conversion-table creation section 31e or target-color-value calculation section 31g) calculates target color values corresponding to the color values of the designated input point by using the standard color profile obtained at the step S301, the reference-device profile obtained at the step S302, and the factor value (Wi) calculated at the step S305 (S306). Then, the control unit 31 (color-conversion-table creation section 31e or target-color-value calculation section 31g) judges whether the calculation of the target color values have been completed on all the input points (S307), if there is an input point for which target color values are not calculated, the flow returns to S304 and the same processing is repeated. Successively, if the calculation of the target color values have been completed on all the input points, the control unit 31 (color-conversion-table creation section 31e) outputs the color values of the input points and the corresponding target color values into the color conversion table, to create the color conversion table (S308).

As described above, in the operation of print processing by using a plurality of image forming apparatuses 40, the following processing of color matching is performed in the present example. One of the image forming apparatuses 40 (for example, offset printing machine 40a) chosen as a reference device, prints an image of a color chart on which color matching was performed by using the standard color profile. On the basis of measured color values given by measurement of the printed color chart with the color measurement device 50, the client terminal 20 creates the reference-device profile. When performing color matching for another of the image forming apparatuses 40 (for example, digital printing machine 40b), the printer controller 30 (profile creation apparatus) creates the color conversion table by combining the standard color profile and the reference-device profile with being weighed (so as to mainly use the standard color profile especially in the high chroma region and mainly use the reference-device profile especially in the low chroma region), and performs color matching for the another of the image forming apparatuses 40 by using the created color conversion table. The above-described color matching can offer both abilities to match colors numerically with the standard colors and abilities to match colors perceptually with colors of the reference device.

The present invention should not be limited to the above embodiments and example, and their constitution and control can be modified unless the modification deviates from the meaning of the present invention.

For example, color matching may be performed such that after a high chroma region and a low chroma region are defined by using a certain value or values of chroma, the standard color profile is mainly used in the high chroma region and the reference-device profile is mainly used in the low chroma region. If perceptual color difference from colors of the reference device is within a tolerance also in the low chroma region, the color matching may be performed by using only the standard color profile. If perceptual color difference from the standard colors is within a tolerance also in the high chroma region, the color matching may be performed by using only the reference-device profile.

Further, in the above example, the color-conversion-table creation section 31e (factor calculation section 31f) of the printer controller 30 creates the characteristic curve and calculates based on the characteristic curve a factor value corresponding to a chroma value of input color values. However, it is not necessary for the profile creation apparatus to create the characteristic curve to obtain the factor values, and the profile creation apparatus may calculate, on the basis of a predetermined formula, the factor value for the chroma value of input color values corresponding to each input point.

Furthermore, in the above example, the description is given to the color matching using two target profiles of the standard color profile and the reference-device profile. However, the color matching method of the present invention can be applied similarly to color matching using three or more target profiles.

The present invention is applicable to a profile creation apparatus to be connected to a system including plural image forming apparatuses, a profile creation program to be executed in the profile creation apparatus, a non-transitory computer-readable storage medium storing the profile creation program, and a color matching method.

The invention claimed is:
1. A profile creation apparatus comprising:
a storage unit;
a hardware processor configured to perform the functions of:
a standard-color-profile obtaining section that obtains a standard color profile to be used for color conversion of input color values into color values defined according to standard colors;
a reference-device-profile obtaining section that obtains a reference-device profile created by using measured color values of a printed matter obtained by printing of a first print image with a first printing device, the first print image being a print image on which color conversion was performed by using the standard color profile;
a color-conversion-table creation section that creates a color conversion table to be used for color conversion of input color values into target color values, by combining the standard color profile and the reference-device profile, and stores the color conversion table in the storage unit; and
a color conversion section that performs color conversion on a second print image to be printed by a second printing device, by using the color conversion table stored in the storage unit, and outputs to the second printing device the second print image on which the color conversion was performed,
wherein the color-conversion-table creation section obtains the target color values to create the color conversion table by adding the standard color profile and the reference-device profile with being weighted by using a factor such that a weighed ratio of the standard color profile increases as chroma calculated from the input color values of the color conversion table increases, for values of the chroma which fall within a predetermined chroma region.

2. The profile creation apparatus of claim 1,
wherein the color-conversion-table creation section
makes the weighted ratio of the standard color profile greater than a weighted ratio of the reference-device profile in a high chroma region where values of the chroma calculated from the input color values of the color conversion table fall within a certain range, and
makes the weighted ratio of the reference-device profile greater than the weighted ratio of the standard color profile in a low chroma region where values of the chroma calculated from the input color values of the color conversion table are smaller than the certain range.

3. The profile creation apparatus of claim 1,
wherein the color-conversion-table creation section
creates a characteristic curve which defines a relation between values of the chroma calculated from the input color values of the color conversion table and values of the factor, on a basis of a point of maximum chroma and a point of minimum chroma in the standard color profile, and
by using the characteristic curve, obtains the values of the factor corresponding to the values of the chroma calculated from the input color values of the color conversion table, to calculate the target color values.

4. The profile creation apparatus of claim 1,
wherein the color conversion section
judges whether a color gamut of the first printing device is included within a color gamut of the standard colors, by comparing the standard color profile and the reference-device profile, and
on judging that the color gamut of the first printing device is included within the color gamut of the standard colors, performs color conversion on the second print image by using one of the standard color profile and the reference-device profile.

5. The profile creation apparatus of claim 1,
wherein, on finding a plurality of the reference-device profiles corresponding to a plurality of printing devices, the reference-device-profile obtaining section obtains one of the plurality of the reference-device profiles corresponding to one of the plurality of printing devices which output a printed matter measured color values of which are closest to color values of the standard colors among measured color values of printed matters output by the plurality of printing devices.

6. The profile creation apparatus of claim 1,
wherein, on finding a plurality of the reference-device profiles corresponding to a plurality of printing devices, the reference-device-profile obtaining section obtains one of the plurality of the reference-device profiles corresponding to one of the plurality of printing devices which is chosen by using one of an average and a median of measured color values of a printed matter output by each of the plurality of printing devices.

7. A non-transitory computer-readable storage medium storing a profile creation program to be executed in a profile creation apparatus to be connected to a plurality of printing devices, the profile creation program, when being executed, causing a control unit of the profile creation apparatus to perform processing comprising:
obtaining a standard color profile to be used for color conversion of input color values into color values defined according to standard colors;
obtaining a reference-device profile created by using measured color values of a printed matter obtained by printing of a first print image with a first printing device, the first print image being a print image on which color conversion was performed by using the standard color profile;
creating a color conversion table to be used for color conversion of input color values into target color values, by combining the standard color profile and the reference-device profile, to store the color conversion table in a storage unit of the profile creation apparatus; and
performing color conversion on a second print image to be printed by a second printing device, by using the color conversion table stored in the storage unit, to output to the second printing device the second print image on which the color conversion was performed,
wherein the creating the color conversion table, includes
obtaining the target color values by adding the standard color profile and the reference-device profile with being weighted by using a factor such that a weighed ratio of the standard color profile increases as chroma calculated from the input color values of the color conversion table increases, for values of the chroma which fall within a predetermined chroma region.

8. The non-transitory computer-readable storage medium of claim 7,
wherein the creating the color conversion table, includes making the weighted ratio of the standard color profile greater than a weighted ratio of the reference-device profile in a high chroma region where values of the chroma calculated from the input color values of the color conversion table fall within a certain range, and making the weighted ratio of the reference-device profile greater than the weighted ratio of the standard color profile in a low chroma region where values of the chroma calculated from the input color values of the color conversion table are smaller than the certain range.

9. The non-transitory computer-readable storage medium of claim 7,
wherein the creating the color conversion table, includes
creating a characteristic curve which defines a relation between values of the chroma calculated from the input color values of the color conversion table and values of the factor, on a basis of a point of maximum chroma and a point of minimum chroma in the standard color profile, and
by using the characteristic curve, obtaining the values of the factor corresponding to the values of the chroma calculated from the input color values of the color conversion table, to calculate the target color values.

10. The non-transitory computer-readable storage medium of claim 7,
wherein the performing the color conversion, includes
judging whether a color gamut of the first printing device is included within a color gamut of the standard colors, by comparing the standard color profile and the reference-device profile, and
on judging that the color gamut of the first printing device is included within the color gamut of the standard colors, performing color conversion on the second print image by using one of the standard color profile and the reference-device profile.

11. The non-transitory computer-readable storage medium of claim 7,
wherein the obtaining the reference-device profile, includes
on finding a plurality of the reference-device profiles corresponding to printing devices among the plurality of printing devices, obtaining one of the plurality of the reference-device profiles corresponding to one of the printing devices which output a printed matter measured color values of which are closest to color values of the standard colors among measured color values of printed matters output by the printing devices.

12. The non-transitory computer-readable storage medium of claim 7,
wherein the obtaining the reference-device profile, includes
on finding a plurality of the reference-device profiles corresponding to printing devices among the plurality of printing devices, obtaining one of the plurality of the reference-device profiles corresponding to one of the printing devices which is chosen by using one of an average and a median of measured color values of a printed matter output by each of the printing devices.

13. A color matching method to be used in a printing system including a plurality of printing devices, a profile creation apparatus, a client terminal and a color measurement device, the method comprising:
creating a color chart, including
creating an image of a color chart by performing color conversion on a first print image by using a standard color profile to be used for color conversion of input color values into color values defined according to standard colors, and
causing a first printing device to print the image of the color chart and output the color chart;
creating a reference-device profile by the client terminal, including
obtaining measured color values of the color chart by causing the color measurement device to measure the color chart, and
creating the reference-device profile by using the measured color values;
obtaining the standard color profile by the profile creation apparatus;
obtaining the reference-device profile from the client terminal by the profile creation apparatus;
creating by the profile creation apparatus a color conversion table to be used for color conversion of input color values into target color values, by combining the standard color profile and the reference-device profile, to store the color conversion table in a storage unit of the profile creation apparatus;
performing by the profile creation apparatus color conversion on a second print image to be printed by a second printing device, by using the color conversion table stored in the storage unit; and
outputting by the profile creation apparatus the second print image on which the color conversion was performed, to the second printing device,
wherein the creating the color conversion table, includes
obtaining the target color values by adding the standard color profile and the reference-device profile to be weighted by using a factor such that a weighed ratio of the standard color profile increases as chroma calculated from the input color values of the color conversion table increases, for values of the chroma which fall within a predetermined chroma region.

14. The color matching method of claim 13,
wherein the creating the color conversion table, includes
making the weighted ratio of the standard color profile greater than a weighted ratio of the reference-device profile in a high chroma region where values of the chroma calculated from the input color values of the color conversion table fall within a certain range, and
making the weighted ratio of the reference-device profile greater than the weighted ratio of the standard color profile in a low chroma region where values of the chroma calculated from the input color values of the color conversion table are smaller than the certain range.

15. The color matching method of claim 13,
wherein the creating the color conversion table, includes
creating a characteristic curve which defines a relation between values of the chroma calculated from the input color values of the color conversion table and values of the factor, on a basis of a point of maximum chroma and a point of minimum chroma in the standard color profile, and
by using the characteristic curve, obtaining the values of the factor corresponding to the values of the chroma calculated from the input color values of the color conversion table, to calculate the target color values.

16. The color matching method of claim 13,
wherein the performing the color conversion, includes judging whether a color gamut of the first printing device is included within a color gamut of the standard colors, by comparing the standard color profile and the reference-device profile, and on judging that the color gamut of the first printing device is included within the color gamut of the standard colors, performing color conversion on the second print image by using one of the standard color profile and the reference-device profile.

17. The color matching method of claim 13, wherein the creating the color chart, includes causing each of printing devices among the plurality of printing devices to output the color chart, and the creating the reference-device profile, includes defining one of the printing devices as the reference device on a basis of measured color values of the color charts output by the printing devices, the one of the printing devices being a printing device which output the color chart measured color values of which are closest to color values of the standard colors among the measured color values of the color charts output by the printing devices, and creating the reference-device profile by using the measured color values of the color chart output by the reference device defined.

18. The color matching method of claim 13, wherein the creating the color chart, includes causing each of printing devices among the plurality of printing devices to output the color chart, and the creating the reference-device profile, includes defining one of the printing devices as the reference device, the one of the printing devices being a printing device chosen by using one of an average and a median of measured color values of the color chart output by each of the printing devices, and creating the reference-device profile by using the measured color values of the color chart output by the reference device defined.

\* \* \* \* \*